(12) United States Patent
Liu et al.

(10) Patent No.: US 8,208,423 B2
(45) Date of Patent: Jun. 26, 2012

(54) METHOD AND ARRANGEMENT FOR EFFICIENTLY UTILIZING RADIO RESOURCES IN A COMMUNICATION SYSTEM

(75) Inventors: Jinhua Liu, Beijing (CN); Hai Wang, Beijing (CN); Rong Hu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 431 days.

(21) Appl. No.: 12/513,952

(22) PCT Filed: Nov. 20, 2006

(86) PCT No.: PCT/SE2006/050490
§ 371 (c)(1),
(2), (4) Date: May 7, 2009

(87) PCT Pub. No.: WO2008/063107
PCT Pub. Date: May 29, 2008

(65) Prior Publication Data
US 2010/0067419 A1    Mar. 18, 2010

(51) Int. Cl.
*H04B 7/185* (2006.01)
(52) U.S. Cl. .................................................. 370/318
(58) Field of Classification Search ............... None
See application file for complete search history.

(56) References Cited

U.S. PATENT DOCUMENTS

| | | | |
|---|---|---|---|
| 6,885,653 B2* | 4/2005 | Choi et al. | 370/342 |
| 7,002,920 B1* | 2/2006 | Ayyagari et al. | 370/252 |
| 7,535,867 B1* | 5/2009 | Kilfoyle et al. | 370/328 |
| 7,856,210 B2* | 12/2010 | Karlsson | 455/69 |
| 2002/0105923 A1 | 8/2002 | Nikides et al. | |
| 2002/0136193 A1* | 9/2002 | Chang et al. | 370/347 |
| 2003/0128673 A1* | 7/2003 | Lee et al. | 370/318 |
| 2004/0077370 A1* | 4/2004 | Dick et al. | 455/522 |
| 2004/0213185 A1* | 10/2004 | Oh et al. | 370/335 |
| 2005/0018656 A1* | 1/2005 | Rudolf et al. | 370/352 |
| 2005/0215276 A1 | 9/2005 | Koo et al. | |
| 2005/0226267 A1* | 10/2005 | Pedersen et al. | 370/465 |
| 2006/0203724 A1* | 9/2006 | Ghosh et al. | 370/229 |
| 2006/0240859 A1 | 10/2006 | Gervais et al. | |
| 2008/0273483 A1* | 11/2008 | Zhang et al. | 370/318 |

FOREIGN PATENT DOCUMENTS

| | | |
|---|---|---|
| CN | 1352497 A | 6/2002 |
| WO | 98/44754 | 10/1998 |
| WO | 2004/088899 | 10/2004 |

OTHER PUBLICATIONS

International Search Report for PCT/SE2006/050490, mailed Feb. 10, 2007.
International Preliminary Report on Patentability, mailed Mar. 9, 2009.
Chinese Office Action issued in Chinese Application No. 200680056427.7, dated May 2, 2012.

* cited by examiner

*Primary Examiner* — Anh-Vu Ly
(74) *Attorney, Agent, or Firm* — Nixon & Vanderhye, P.C.

(57) ABSTRACT

The invention relates to a method and an arrangement of efficiently utilizing radio resources in a communication network, comprising a communication network node communicating with one or more user equipments over a radio interface, wherein at least two communication services are provided on said radio interface, each having a certain amount of power allocated in an interactively way. The interaction between said at least two communication services is minimized in order to obtain an enhanced power utilization.

12 Claims, 6 Drawing Sheets

METHOD AND ARRANGEMENT FOR EFFICIENTLY UTILIZING RADIO RESOURCES IN A COMMUNICATION SYSTEM

This application is the U.S. national phase of International Application No. PCT/SE2006/050490, filed 20 Nov. 2006, which designated the U.S. the entire contents of which is hereby incorporated by reference.

TECHNICAL FIELD

The technology disclosed herein relates to a method and an arrangement in a communication system, and in particular to an arrangement allowing for efficiently utilizing radio resources in a communication network as well as a method for such utilization. The technology disclosed herein further relates to a computer-readable medium containing computer program for efficiently utilizing radio resources in a communication network.

BACKGROUND

Telecommunication systems according to the 3GPP-standard offer high and variable bit-rates and are capable of providing new types of services to the users, involving real-time audio and video, still images and text, e.g. news, sport results and weather forecasts. By means of the High Speed Downlink Packet Access (HSDPA)-feature of the 3GPP-standard, the system capacity and the peak data rates are increased in the downlink direction, and the transfer delays are reduced. In order to be able to use the HSDPA service, the user must have a user equipment that is HSDPA capable, otherwise the user can only use DCH services provided by earlier releases of the standard.

In WCDMA systems, the dedicated channel (DCH) services according to an earlier release of the standard and the high speed downlink packet access (HSDPA, hereinafter referred to as HS) services can be run simultaneously in a same cell with a same carrier. For HS services, there could be a very large power fluctuation over HS time transmission intervals (TTIs), usually 2 ms which corresponds to three time slots. This is extremely true for the delay sensitive low bit-rate HS Guaranteed Bit-Rate (GBR) services because the data has to be scheduled in very bad channel conditions sometimes due to the tight delay requirements. For DCH services, the signal to interference ratio (SIR) target is adjusted by an outer loop power control (OLPC) in order to reach the block error rate (BLER) target, and the DCH power is adjusted by an inner loop power control (ILPC) in order to reach the SIR target. The ILPC combats the fast interference fluctuation. The OLPC combats the influence of the environment and user equipment (UE) mobility which can not be completely conquered by the ILPC. The OLPC execution period depends on the DCH TTI length.

Currently, there are two existing solutions to allocate the HS power. The first solution is that all the remaining power resource can be allocated as the available power resource for HS service. The second solution is to allocate a certain fixed available power for HS services. In this solution, there is a fixed amount of power resources reserved for HS services. The power interaction between HS and DCH services exists in these two solutions and this power interaction could be more serious in the first solution than in the second solution. This means that additional measures could be taken to handle such power interaction to improve the system performance.

For the first solution, the power interaction between HS and DCH service is shown FIG. 2, in which the HS power is denoted 20 and the DCH power 21. The total available power is denoted 22. The mean value of the HS power and the mean value of the DCH power are denoted 27 and 28 respectively. Also, in FIG. 2, the HS operation area is represented with 23 and the unused power is shown as 26. Suppose the DCH TTI, denoted with 25, is 20 ms, e.g. DCH Circuit switched (CS) speech, the OLPC execution period is 20 ms and the ILPC is performed once per slot. For HS service, both the HS-SCCH and HS-DSCH power are adjusted once per TTI, denoted with 24, i.e., 3 time slots. Though the ILPC frequency is higher than that of the HS-SCCH and HS-DSCH power adjustment, the ILPC could not effectively combat the interference peak in the first time slot of the HS TTI 24 when a sudden large HS power is allocated and sometimes could not be fast enough to combat the HS interference in the following 2 consecutive slots. That's because the sudden HS power increase (in dB) could be several times as the ILPC up step (in dB). This means that the probability of DCH block error occurring is much higher when a sudden high HS pulse (clear from FIG. 1) occurs than without such an HS power change. Because of the jump algorithm in the OLPC for DCH, when a data block for a UE is erroneous, the target SIR is increased in a large step (shown with small arrows pointing upwards), while when a block for the UE is right, the target SIR is decreased in a much smaller step (shown with small arrows pointing downwards). Even though such kind of high HS pulse may happen at a very low frequency, the OLPC adjusts the target SIR for DCH services to a relatively high level in order to reach the BLER target. Afterwards, for most HS TTIs 24 with very low HS Tx power, the SIR target for most DCH users is much higher than necessary, which is obviously a power waste.

For the second solution, besides the similar power interaction between HS and DCH service as in FIG. 2, there is another problem of low power utilization efficiency because the HS power limit does not change even though more power could be allocated for HS services when the situation with very high HS and very low DCH traffic load encountered or more power could be allocated for DCH services when the situation with very low HS and very high DCH traffic load encountered.

SUMMARY

Accordingly, it is an objective with the technology disclosed herein to provide an improved method of efficiently utilizing radio resources in a communication network comprising a communication network node communicating with one or more user equipments over a radio interface, wherein at least two communication services are provided on said radio interface, each having a certain amount of power allocated in an interactively way.

Another objective with the technology disclosed herein is to provide an improved communication network node arranged to efficiently utilize radio resources in a communication network and to communicate with one or more user equipments over a radio interface, wherein at least two communication services are provided on said radio interface, each having a certain amount of power allocated in an interactively way.

A still further objective with the technology disclosed herein is to provide an improved computer-readable medium of efficiently utilizing radio resources in a communication network comprising a communication network node communicating with one or more user equipments over a radio interface, wherein at least two communication services are provided on said radio interface, each having a certain amount of power allocated in an interactively way.

In example embodiments method and an arrangement are provided for minimizing the power interaction between DCH and HS services which results in higher power utilization efficiency and better system performance by improving the ILPC and OLPC algorithm and dynamically setting HS power limit, the system capacity and throughput is increased.

According to a first aspect of the technology disclosed herein, the interaction is minimized by pre-adjusting the DCH power based on the prediction of the HS pulse. And, thus, the unnecessarily high DCH power level caused by HS power fluctuation can be reduced, which results in the decrease of average non-HS power and therefore more available power for HS services.

According to a second aspect of the technology disclosed herein, the interaction is minimized by improving the outer loop power control. Thus, in case of low traffic load of low activity HS services, the unnecessarily high DCH SIR target can be quickly adjusted to the required level after HS pulse disappears, which results in the lower power waste for DCH users.

According to a third aspect of the technology disclosed herein, the interaction is minimized by decreasing the peak to average power ratio caused by HS power fluctuation. Thus, the required QoS of HS services can be reached. Both the inter-cell and intra-cell interference are decreased. The QoS trade-off between HS and DCH service is also partly controlled by the dynamic adjustment of the HS power limit.

According to a third aspect of the present technology disclosed herein, the interaction is minimized by decreasing the peak to average power ratio caused by HS power fluctuation. Thus, the required QoS of HS services can be reached. Both the inter-cell and intra-cell interference are decreased. The QoS trade-off between HS and DCH service is also partly controlled by the dynamic adjustment of the HS power limit.

Still other objects and features of the technology disclosed herein will become apparent from the following detailed description considered in conjunction with the accompanying drawings. It is to be understood, however, that the drawings are designed solely for purposes of illustration and not as a definition of the limits of the technology disclosed herein, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
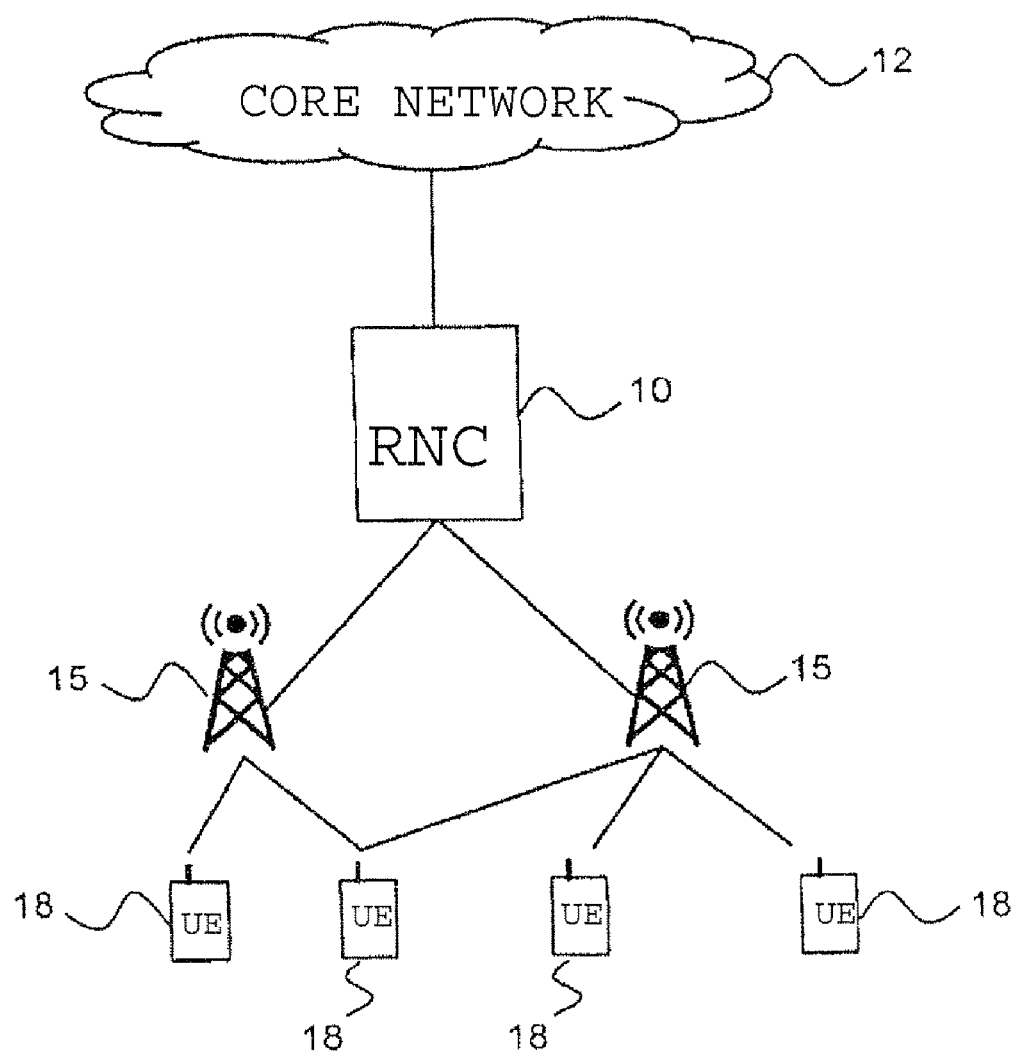
FIG. 1 shows the communication network architecture according to the technology disclosed herein.
Figure 2:
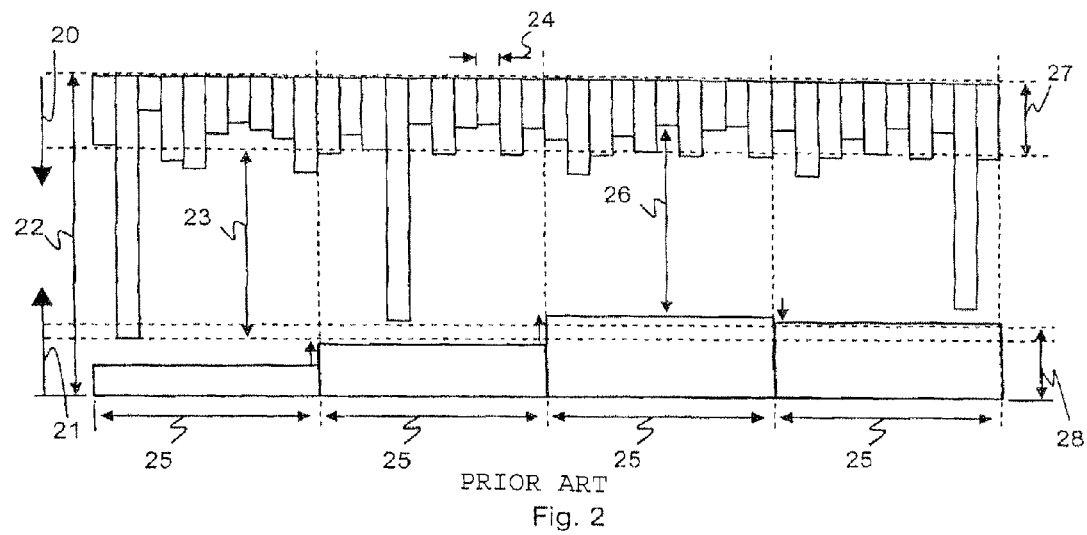
FIG. 2 shows a prior art interaction between HSDPA and DCH services.

FIG. 1 depicts a communication system such as a WCDMA communication system including a Radio Access Network (RAN), such as the UMTS Terrestrial Radio Access Network (UTRAN) architecture, comprising at least one Radio Base Station (RBS) (or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels and uplink (UL) channels. On the downlink channel, the RBS 15 transmits to each user equipment 18 at respective power level. On the uplink channel, the user equipments 18 transmit data to the RBS 15 at respective power level. According to a preferred embodiment of the technology disclosed herein, the communication system is herein described as a WCDMA communication system. The skilled person, however, realizes that the inventive method and arrangement works very well on other communication systems as well.

The technology disclosed herein relates to a combined HS (first communication service) and DCH (second communication service) scenario and discloses a method and an arrangement of efficiently utilizing radio resources in a communication network, comprising a communication network node, such as a radio base station 15, communicating with one or more user equipments 18 over a radio interface, wherein at least two communication services, i.e. DCH and HS, are provided on said radio interface, each having a certain amount of power allocated in an interactively way. The method comprises the step of minimizing said interaction between said at least two communication services when allocating power to said at least two communication services.

Figure 3:
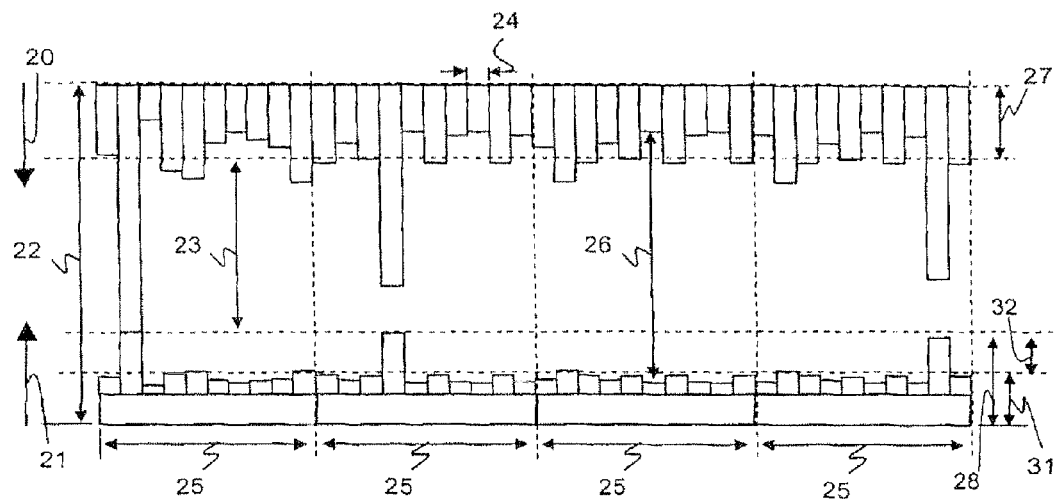
FIG. 3 shows an interaction between HSDPA and DCH services according to a first embodiment of the technology disclosed herein.

A first preferred embodiment of minimizing the interaction between the DCH and the HS services according to the technology disclosed herein is shown in FIG. 3, in which the HS power is denoted 20 and the DCH power 21. The total available power is denoted 22. The mean values of the HS power and the DCH power are denoted 27 and 28 respectively. The HS operation area is represented with 23 and the unused power is shown as 26. Further, the HS TTI is denoted 24 and the DCH TTI is denoted 25. Reference number 28 shows the mean value of the DCH power when no action has been taken, i.e. according to prior art, while the mean value of the DCH power when the first preferred embodiment of the technology disclosed herein has been used is shown with 31 and, thus 32 shows the saved DCH power.

Figure 4:
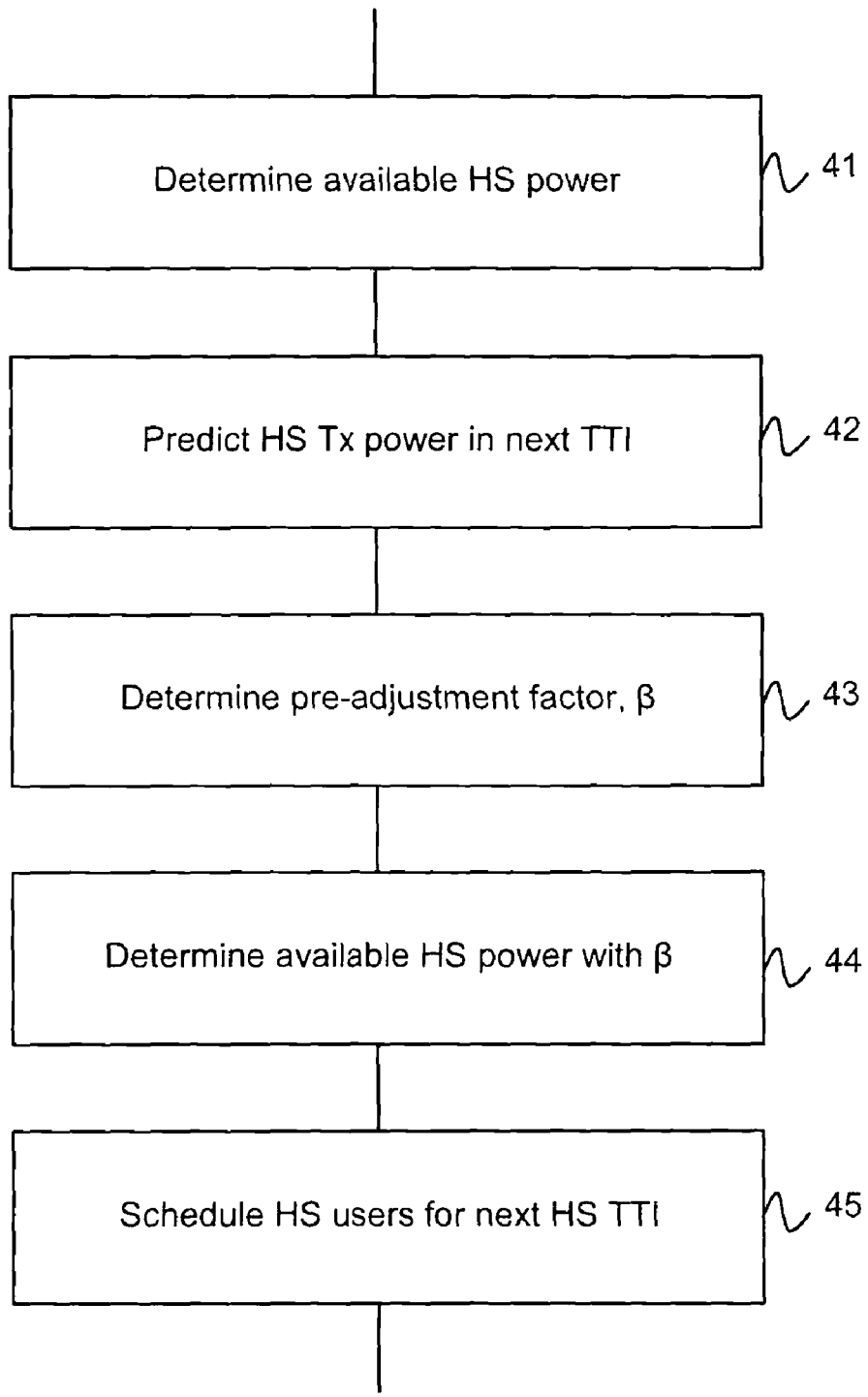
FIG. 4 is a flowchart showing the method according to the first embodiment of the technology disclosed herein.

According to this first preferred embodiment the coming HS pulse is combated by pre-adjusting the DCH power based on the prediction of the HS pulse so that the sudden HS power increase does not result in an obvious increase of the error probability for the DCH data block. For the first time slot of every HS TTI, besides the ILPC, the Tx power for every DPCH channel is pre-adjusted, $P'_{DPCH(k), next} = P_{DPCH(k), next} * \beta$;

For the following 2 time slots of the HS TTI, the ILPC works as normal, i.e., $P'_{DPCH(k), next} = P_{DPCH(k), next}$;

$P_{DPCH(k), next}$ is the power for DPCH k after the ILPC. $P'_{DPCH(k), next}$ is the Tx power for DPCH k after the pre-adjustment. B is the pre-adjustment factor for HS pulse combating, which can be determined, for example, in the following way, also shown in FIG. 4:

Determine the available HS power in next HS TTI before the pre-adjusting of the DCH power: $P_{HS\ available,next} = P_{tot} - P_{nonHS,curr}$ (step 41);

Predict the HS Tx power in the next TTI (referred as $P_{HS,next}$) based on $P_{HS\ available,next}$ (step 42);

Determine pre-adjustment factor β (step 43);

$$\mu = (P_{HS,next} + P_{nonHS,curr})/(P_{HS,curr} + P_{nonHS,curr});$$

If μ>1, $$\beta = \frac{\left(P_{HS\cdot next} + \left(P_{CCH} + \mu * \sum_{k=1}^{N} P_{DPCH(k)\cdot next}\right)\right)}{(P_{HS\cdot curr} + P_{nonHS\cdot curr})};$$

Else

β=1;

The scheduling of HS users for next TTI is done based on the pre-adjusted DCH power;

Determine the available HS power with the pre-adjusted DCH power (step 44):

$$P'_{HS\ available\cdot next} = P_{tot} - \left(P_{CCH} + \sum_{k=1}^{N} P'_{DPCH(k)\cdot next}\right);$$

Based on $P'_{HS\ available,next}$ and the CQI reporting, schedule the HS users for the next HS TTI (step 45).

$P_{tot}$ is the total available cell power. $P_{HS\ available,next}$ is the available HS power in the next HS TTI without the DCH power pre-adjustment. $P_{HS,next}$ is the total HS Tx power in the next HS TTI without the DCH power pre-adjustment. $P'_{HS\ available,\ next}$ is the available HS power in the next HS TTI based on the pre-adjusted DCH power. $P_{CCH}$ is the total Tx power for common control channel. $P_{HS,curr}$ is the HS Tx power in the current HS TTI. $P_{nonHS,curr}$ is the non-HS Tx power in the current HS TTI. N is the number of DCH channels.

The above described algorithm processes once per HS TTI.

According to a second preferred embodiment of minimizing the interaction between the DCH and the HS services according to the technology disclosed herein, the OLPC is improved. In this second preferred embodiment, the SIR target is adjusted to the necessary level quickly after the high HS pulse disappears. In particular, this method works well with low HS traffic load of the low-activity HS services. In such a situation, the very high HS pulse is rare. Hence it is resource wasteful from the power perspective to stay at a very high SIR target for a relatively long time by using the conventional jump algorithm after the high HS pulse disappears.

Figure 5:
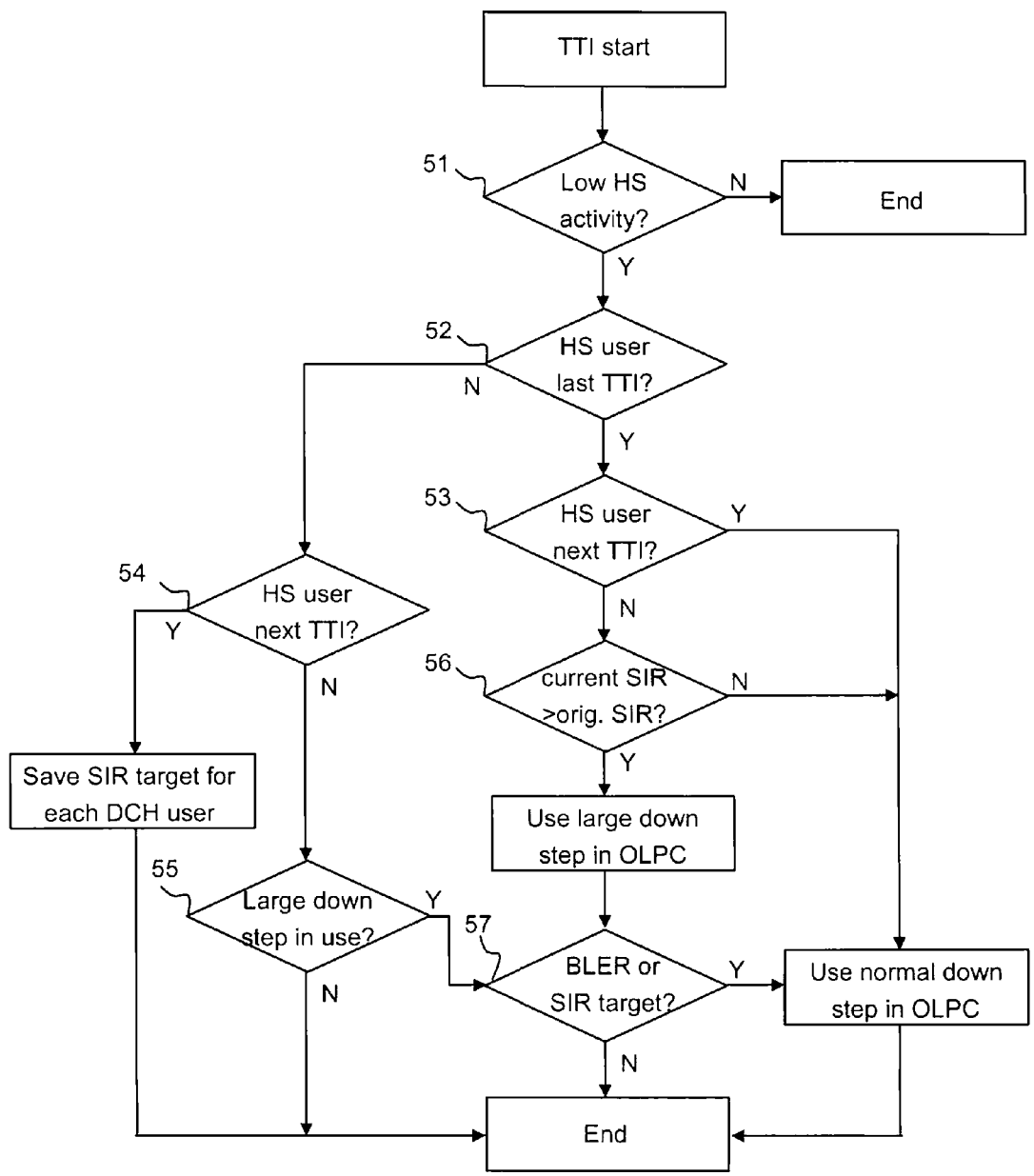
FIG. 5 is a flowchart showing the method according to the second embodiment of the technology disclosed herein.

Thus, the procedure according to the second preferred embodiment of the technology disclosed herein, shown in FIG. 5, is as follows:

The TTI starts;

If only low load of low activity HS services, such as Voice over IP (VoIP) exist (51), continue to 52, otherwise end the procedure;

At 52, check if there are HS users which were scheduled in the last HS TTI. If the answer is yes, continue to 53 otherwise continue to 54;

At 53, check if there are HS users to be scheduled in the next HS TTI. If yes, use a normal down step in the OLPC and end procedure otherwise continue to 56;

At 56, check if the current SIR target is larger than the original SIR target for each DCH user. If yes, use a larger than normal down step in the OLPC and continue to 57 otherwise use a normal down step in the OLPC and end the procedure;

At 54, check if there are HS users to be scheduled in the next HS TTI. If yes, save the SIR target for each DCH user and end procedure otherwise continue to 55;

At 55, check for each DCH user if the larger than normal down step is already used in the OLPC. If yes, continue to 57 otherwise end the procedure;

At 57, if a block error occurs or the original SIR target is hit, use a normal down step in the OLPC and end the procedure otherwise end the procedure directly.

Figure 6:
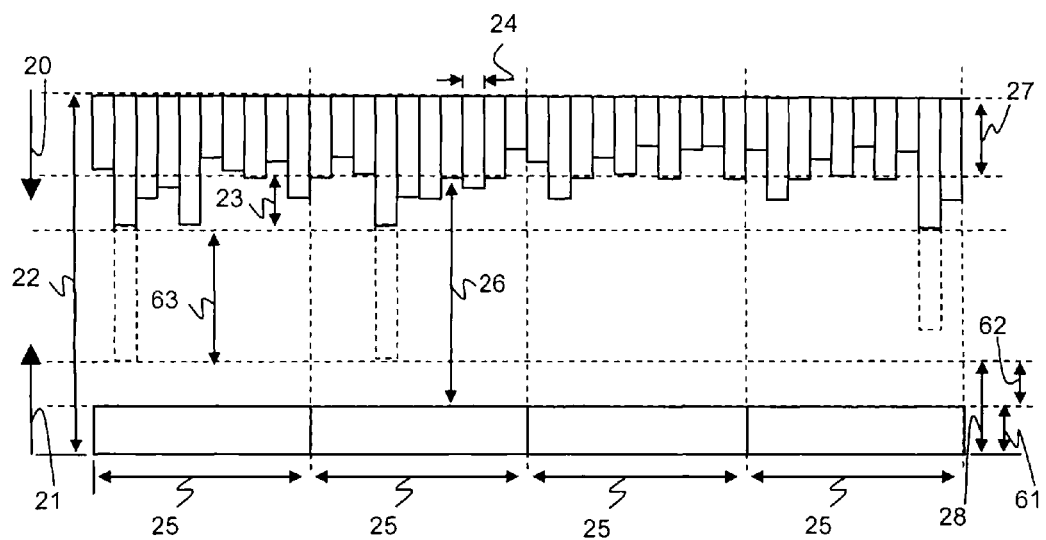
FIG. 6 shows an interaction between HSDPA and DCH services according to a third embodiment of the technology disclosed herein.

A third preferred embodiment of minimizing the interaction between the DCH and the HS services is Shown in FIG. 6, in which the HS power is denoted 20 and the DCH power 21. The total available power is denoted 22. The mean values of the HS power and the DCH power are denoted 27 and 28 respectively. The HS operation area is represented with 23 and the unused power is shown as 26. Further, the HS TTI is denoted 24 and the DCH TTI is denoted 25. Reference number 28 shows the mean value of the DCH power when no action has been taken, i.e. according to prior art, while the mean value of the DCH power when the third preferred embodiment of the technology disclosed herein has been used is shown with 61 and, thus, 62 shows the saved DCH power.

According to this third preferred embodiment of the technology disclosed herein the peak to average power ratio is decreased, shown as 63, so that the sudden high HS power pulse does not happen. This can be realized by setting a dynamic power limit for HS services (referred to as P.sub.HS, limit 64) according to the HS QoS requirement and the served traffic load. By using this method, the DCH service can reach the BLER target with a much lower target SIR, which results in a lower average DCH power 61.

The principles for the algorithm of the third preferred embodiment of the technology disclosed herein are:

1) The allocated HS Tx power cannot exceed $P_{HS,limit}$ even if more power is available;

2) $P_{HS,limit}$ can be periodically adjusted with the channel status and the served HS load;

3) $P_{HS,limit}$ should be at least high enough to ensure a target ratio of users satisfied. For example, the target satisfaction rate is 95% for HS VoIP service. The reserved HS power should be not less than $P_{HS,limit}$ when doing the DCH power control;

4) With HS GBR services of different priorities, the $P_{HS,limit}$ should be evaluated independently for each priority class, the maximum one within which can be used as the HS power limit.

Figure 7:
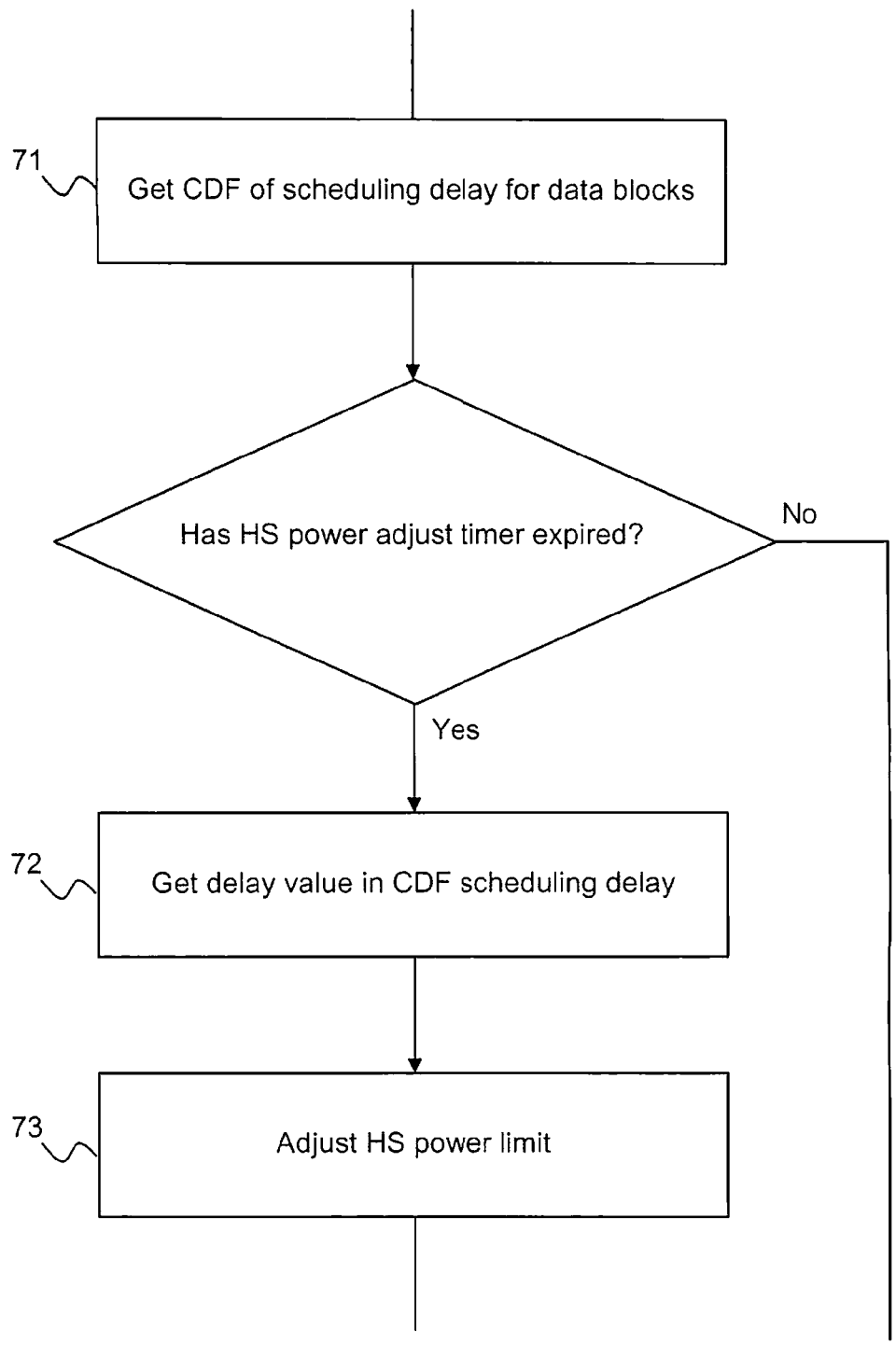
FIG. 7 is a flowchart showing the method according to the third embodiment of the technology disclosed herein.

According to 3), the required HS power can be used as the HS power limit. An exemplifying procedure to evaluate the Hs power limit $P_{HS,limit}$ for each HS priority class, shown in FIG. 7, is as follows:

Get the Cumulative Distribution Function (CDF) of scheduling delay for the data blocks of the priority class in the MAC-hs scheduler (step 71);

When the HS power adjust timer in the period of $T_{HS\ limit}$ expires, get the delay value $t_{Delay\_thres}$ at the pre-determined point in the CDF of scheduling delay (step 72); and, Adjust the HS power limit (step 73):

If $t_{Delay} > T_{Delay\_thres}$, $$P_{HS,limit} = P_{HS,limit} + \Delta_{up}$$

Else $$P_{HS,limit} = P_{HS,limit} - \Delta_{down}$$

$T_{HS\ limit}$ is the period of HS power limit adjustment. $\Delta_{up}$ is the up step and $\Delta_{down}$ is the down step for $P_{HS,limit}$ adjustment.

The delay threshold $T_{Delay\_thres}$ is determined by the delay requirement of HS services and therefore can be different for different HS priority classes. The delay value $t_{Delay}$ less than $T_{Delay\_thres}$ means that more than enough HS power is reserved for this priority class and therefore $P_{HS,limit}$ for this priority class should be decreased. Otherwise, the delay value $t_{Delay}$ larger than $T_{Delay\_thres}$ means the target ratio of HS users with this priority can not be reached so that the HS power limit for this priority class should be increased. Actually the adjustment of $P_{HS,limit}$ is a kind of jump algorithm.

In a fourth preferred embodiment of the technology disclosed herein the first and the third preferred embodiments of the technology disclosed herein are combined. That is, the DCH power is pre-adjusted as described above in relation to the first preferred embodiment and a dynamic HS power limit is set and evaluated as described above in relation to the third preferred embodiment.

It will be appreciated that at least some of the procedures described above are carried out repetitively as necessary to respond to the time-varying characteristics of the channel between the transmitter and the receiver. To facilitate understanding, many aspects of the technology disclosed herein are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Figure 8:
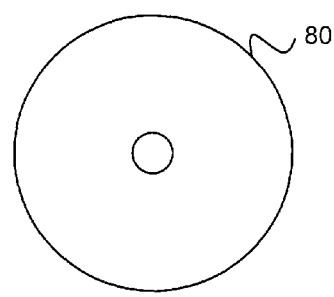
FIG. 8 shows an example of a computer readable medium.

Moreover, the technology disclosed herein can additionally be considered to be embodied entirely within any form of computer-readable storage medium, an example of which is shown in FIG. 8 and denoted 80, having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" 30 can be any means that can contain, store, communicate, propagate, or transport the program for use by or in connection with the instruction-execution system, apparatus or device. The computer-readable medium 30 can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the technology disclosed herein for efficiently utilizing radio resources in a communication network, comprising a communication network node communicating with one or more user equipments over a radio interface, wherein at least two communication services are provided on said radio interface, each having a certain amount of power allocated in an interactively way, is provided wherein the computer program performs the step of minimizing said interaction between said at least two communication services when allocating power to said at least two communication services.

Modifications to embodiments of the technology disclosed herein described in the foregoing are possible without departing from the scope of the technology disclosed herein as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of efficiently utilizing radio resources in a communication network, the communication network comprising a communication network node communicating with one or more user equipments over a radio interface, wherein at least two communication services are provided on said radio interface, each having a certain amount of power allocated in an interactive way, the method comprising:
reducing the power interaction, by the communication network node, between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;
wherein reducing the power interaction comprises:
predicting when a power peak will arise in said first communication service;
pre-adjusting the power of said second communication service based on said prediction.

2. The method according to claim 1, further comprising decreasing a peak to average power ratio by setting a dynamic power limit for said first communication service.

3. A method of efficiently utilizing radio resources in a communication network, the communication network comprising a communication network node communicating with one or more user equipments over a radio interface, wherein at least two communication services are provided on said radio interface, each having a certain amount of power allocated in an interactive way, the method comprising:
reducing the power interaction, by the communication network node, between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;
wherein reducing the power interaction further comprises:
determining available power for said first communication service in next time transmission interval of said first communication service;
predicting a transmit power of said first communication service in the next time transmission interval based on said determined available power;

determining a pre-adjustment factor based on said predicted transmit power;
using said factor in order to pre-adjust the power of said second communication service;
determining available power for said first communication service when said power of said second communication service has been pre-adjusted;
scheduling users of said first communication service based on said available power for said first communication service when said power of said second communication service has been pre-adjusted.

4. A method of efficiently utilizing radio resources in a communication network, the communication network comprising a communication network node communicating with one or more user equipments over a radio interface, wherein at least two communication services are provided on said radio interface, each having a certain amount of power allocated in an interactive way, the method comprising:
reducing said power interaction, by the communication network node, between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;
wherein reducing the power interaction comprises:
improving an outer loop power control in said communication network by adjusting a signal to interference ratio target for said second communication service to a pre-determined level after a power peak in said first communication service has disappeared.

5. A method according to claim 4, further comprising:
checking if there were first communication service users scheduled in a last time transmission interval;
if there were first communication service users scheduled in the last time transmission interval and there are first communication service users scheduled in next time transmission interval, using a normal power down step in said outer loop power control;
if there were first communication service users scheduled in the last time transmission interval but there are no first communication service users scheduled in next time transmission interval and, if for each user of said second communication service a current signal to interference ratio target is larger than an original signal to interference ratio target, using a larger than normal power down step in said outer loop power control;
if there were first communication service users scheduled in the last time transmission interval but there are no first communication service users scheduled in next time transmission interval and, if for each user of said second communication service the current signal to interference ratio target is less than the original signal to interference ratio target, using the normal power down step in said outer loop power control;
if there were no first communication service users scheduled in the last time transmission interval but there are first communication service users scheduled in next time transmission interval, saving for each user of said second communication service a signal to interference ratio target;
if there were no first communication service users scheduled in the last time transmission interval and there are no first communication service users scheduled in next time transmission interval, checking if a larger than normal power down step already is used in said outer loop power control;
it a larger than normal power down step already is used in said outer loop power control and a block error occurs or the signal to interference target of said second communication service is hit, using the normal power down step in said outer loop power control.

6. A communication network node arranged to efficiently utilize radio resources in a communication network and to communicate with one or more user equipments over a radio interface, wherein at least two communication services are provided on said radio interface, each having a certain amount of power allocated in an interactive way, the communication network node comprises a computer configured to execute instructions for reducing said power interaction between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;
wherein the computer is configured to execute instructions
for predicting when a power peak will arise in said first communication service;
for pre-adjusting the power of said second communication service based on said prediction.

7. The communication network node according to claim 6, wherein the computer is further configured to execute instructions:
for decreasing a peak to average power ratio arranged to set a dynamic power limit for said first communication service.

8. A communication network node arranged to efficiently utilize radio resources in a communication network and to communicate with one or more user equipments over a radio interface, wherein at least two communication services are provided on said radio interface, each having a certain amount of power allocated in an interactive way, the communication network node comprises a computer configured to execute instructions for reducing said power interaction between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;
wherein the computer is configured to execute instructions:
for improving an outer loop power control in said communication network arranged to adjust a signal to interference ratio target for said second communication service to a pre-determined level after a power peak in said first communication service has disappeared.

9. A non-transistory computer-readable medium containing computer executable instructions for efficiently utilizing radio resources in a communication network, comprising a communication network node communicating with one or more user equipments over a radio interface, wherein at least two communication services are provided on said radio interface, each having a certain amount of power allocated in an interactively way, wherein when executed the computer executable instructions performs the steps of:

reducing said power interaction between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;

predicting when a power peak will arise in said first communication service;

pre-adjusting the power of said second communication service based on said prediction.

10. A non-transistory computer-readable medium of claim 9, wherein in reducing the power interaction the computer executable instructions perform the further step of decreasing a peak to average power ratio by setting a dynamic power limit for said first communication service.

11. A non-transistory computer-readable medium containing computer executable instructions for efficiently utilizing radio resources in a communication network, comprising a communication network node communicating with one or more user equipments over a radio interface, wherein at least two communication services are provided on said radio interface, each having a certain amount of power allocated in an interactively way, wherein when executed the computer executable instructions perform the steps of:

reducing said power interaction between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;

wherein in reducing the power interaction the computer executable instructions perform the further steps of:

determining available power for said first communication service in next time transmission interval of said first communication service;

predicting a transmit power of said first communication service in the next time transmission interval based on said determined available power;

determining a pre-adjustment factor based on said predicted transmit power;

using said factor in order to pre-adjust the power of said second communication service;

determining available power for said first communication service when said power of said second communication service has been pre-adjusted;

scheduling users of said first communication service based on said available power for said first communication service when said power of said second communication service has been pre-adjusted.

12. A non-transistory computer-readable medium containing computer executable instructions for efficiently utilizing radio resources in a communication network, comprising a communication network node communicating with one or more user equipments over a radio interface, wherein at least two communication services are provided on said radio interface, each having a certain amount of power allocated in an interactively way, wherein when executed the computer executable instructions perform the steps of:

reducing said power interaction between said at least two communication services when allocating power to said at least two communication services, so as to allocate more power to a first one of said at least two communication network services than to a second one of said at least two communication network services when there is a high traffic load on said first communication network service and a relatively lower traffic load on said second communication network service or vice versa;

wherein in reducing the power interaction the computer executable instructions perform the further step of:

improving an outer loop power control in said communication network by adjusting a signal to interference ratio target for said second communication service to a pre-determined level after a power peak in said first communication service has disappeared.

* * * * *

UNITED STATES PATENT AND TRADEMARK OFFICE
CERTIFICATE OF CORRECTION

PATENT NO.       : 8,208,423 B2
APPLICATION NO.  : 12/513952
DATED            : June 26, 2012
INVENTOR(S)      : Liu et al.

It is certified that error appears in the above-identified patent and that said Letters Patent is hereby corrected as shown below:

In Column 3, Lines 31-37, delete "According to a third aspect of the present.... Limit.".

In Column 3, Line 37, below "HS power limit.",
insert -- According to a fourth aspect of the technology described herein, the interaction is minimized by pre-adjusting the DCH power based on the prediction of the HS pulse and decreasing the peak to average power ratio caused by HS power fluctuation. --, as a new paragraph.

In Column 4, Line 15, delete "(UE)" and insert -- (UEs) --, therefor.

In Column 5, Lines 13-15, delete "$\beta = \frac{\left(P_{HS,next} + \left(P_{CCH} + \mu * \sum_{k=1}^{N} P_{DPCH(k),next}\right)\right)}{(P_{HS,curr} + P_{nonHS,curr})};$" and insert -- $\beta = \frac{\left(P_{HS,next} + \left(P_{CCH} + \mu * \sum_{k=1}^{N} P_{DPCH(k),next}\right)\right)}{(P_{HS,curr} + P_{nonHS,curr})};$ --, therefor.

In Column 5, Lines 26-29, delete "$P'_{HS\ available,next} = P_{tot} - \left(P_{CCH} + \sum_{k=1}^{N} P'_{DPCH(k),next}\right);$" and insert -- $P'_{HS\ available,next} = P_{tot} - \left(P_{CCH} + \sum_{k=1}^{N} P'_{DPCH(k),next}\right);$ --, therefor.

In Column 10, Line 4, in Claim 5, delete "it" and insert -- if --, therefor.

Signed and Sealed this
First Day of January, 2013

David J. Kappos
*Director of the United States Patent and Trademark Office*